Oct. 30, 1956 A. P. DANK ET AL 2,769,037

MOUNTING DEVICE FOR A MAGNETIC TRANSDUCER HEAD

Filed April 17, 1952

INVENTOR.
ALFRED P. DANK
LEONARD S. SPETH

BY Ebes J. Hyde
ATTORNEY

United States Patent Office 2,769,037

Patented Oct. 30, 1956

2,769,037

MOUNTING DEVICE FOR A MAGNETIC TRANSDUCER HEAD

Alfred P. Dank, Euclid, and Leonard S. Speth, Mayfield Heights, Ohio, assignors, by mesne assignments, to Clevite Corporation, Cleveland, Ohio, a corporation of Ohio Application April 17, 1952, Serial No. 282,874

7 Claims. (Cl. 179—100.2)

This invention pertains to a mounting device for mounting a magnetic recorder-reproducer head adjacent to a magnetizable record member, and is particularly concerned with a head mounting device for use with magnetic recorder-reproducer having a rotatable drum upon which the record member is mounted and a lead screw for moving the transducer head longitudinally with respect to the drum.

In drum-type recorder-reproducers, it has long been a problem to mount the transducer head so that it will engage the record material with the air-gap in the pole piece of the head touching the record material at a given point where the tangent to the drum at that point is perpendicular to the vertical axis through the head. If the head touches the record material at any other point, inferior results are obtained as the record material does not properly bridge the air gap in the head. For best results, it is desirable that an optimum amount of pressure be exerted between the head and the record material. Often the force of gravity holding the head down on the record material is not sufficient, resulting in poor contact between the head and the record material with consequent inferior reproduction of the record on the material.

In the past, it has been difficult to obtain the desired results without using expensive bearings to support the head. Accordingly, it is an object of the invention to provide an inexpensive yet reliable mounting device for holding a magnetic transducer head adjacent a drum-type record member.

A further object of the invention is to provide a bearing construction for a magnetic transducer head which is inexpensive yet which has no appreciable play even after considerable service.

Another object of the invention is to provide a mounting structure for a magnetic transducer head which includes means to permit several adjustments of the head with respect to the record material in order that the best performance of which the head is capable may be obtained.

Still another object of the invention is to provide an inexpensive high-quality mount for a magnetic transducer head which may be adjusted in a number of ways in order to obtain maximum performance from the head and which, when it is properly adjusted, will always cause the transducer head to properly engage the record material.

For a better understanding of the present invention, together with other and further objects thereof, reference is had to the following description, taken in connection with the accompanying drawings, and its scope will be pointed out in the appended claims.

With reference to the single sheet of drawings.

The mounting device of the invention is particularly adapted for mounting a magnetic transducer head 10 adjacent a magnetizable record member 11, and it is particularly suitable for mounting a ring-type magnetic transducer head in engagement with a drum-type record member.

Figure 1:
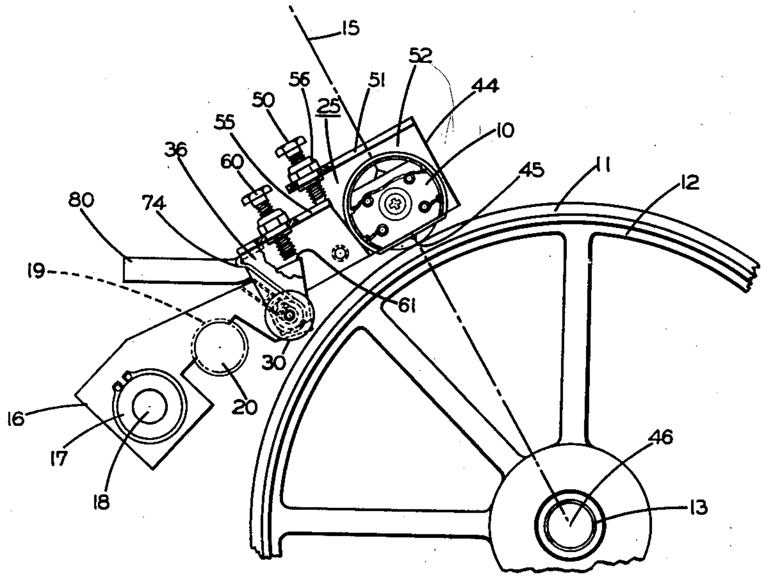
Fig. 1 shows a side view of the transducer head mounting device of the invention holding the head in proper relation to a drum-type record.
Figure 2:
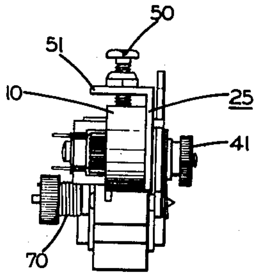
Fig. 2 is a view looking at the end of the transducer head and holder.

In Fig. 1 there is shown a drum 12 mounted for rotation about its axis 13. Stretched around the surface of the drum is the record member 11 which in the present case comprises an endless belt of rubber material in which there is a quantity of powdered magnetizable material such as iron oxide.

One of the problems in the art of recording on and reproducing from a belt-type record member is to so mount the head 10 with respect to the record member 11 that a line 15 extending through the two air gaps in the core of the head will always be perpendicular to the tangent to the drum at the point where the head engages the drum. It is desirable for the operator to be able to lift the head 10 off of the drum 11 and to be able to put the head back on the same spot from which it has been removed. It is also desirable that the forces coupling the head 10 to the record member 11 be substantially the same all of the time while the head is riding on the record member 11.

In order to achieve all of these desirable features, there is provided a carriage 16 including a bearing member 17 which slides easily along the support shaft 18 when the carriage 16 is lifted so that the threaded half-nut 19 is out of engagement with the threads on the spirally threaded lead screw 20. The carriage 16 may be pivoted about the support shaft 18 to lower the forward or pivot end of the carriage 16 until the threaded half-nut section 19 of the carriage engages the lead screw 20 and the threads of the lead screw mesh with the threads of the half-nut section. The carriage is then supported for motion longitudinally across the drum 12 as the lead screw 20 turns.

An arm 25 is pivotably connected to the carriage 16, and the transducer head 10 is connected to the end of the arm 25.

Figure 4:
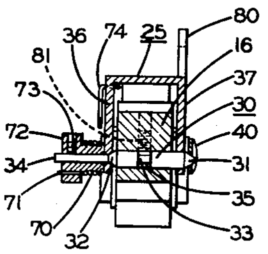
Fig. 4 is a sectional view taken along line 4—4 of Fig. 3.
Figure 3:
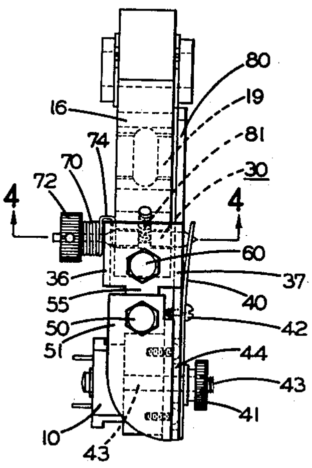
Fig. 3 is a view looking down on the holder and transducer head.
Figure 5:
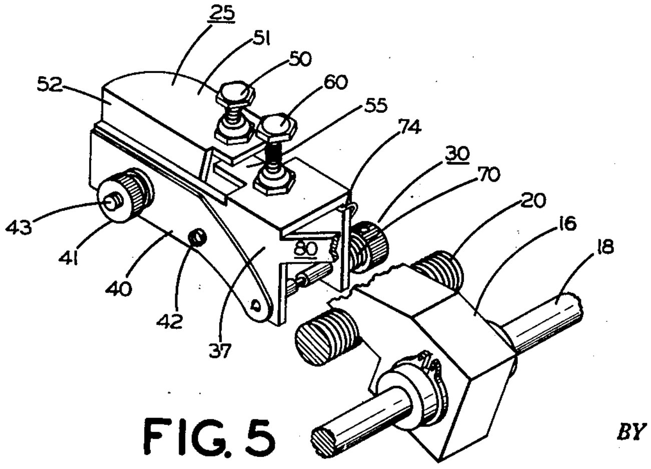
Fig. 5 is an isometric view of the holder and transducer head.

Figs. 4 and 5 show in detail the pivot and the manner in which the pivot member 30 connects the arm 25 to the carriage 16. The pivot member 30 is a metal shaft having a conically pointed end 31 and a conical shoulder section 32 spaced from conical end 31. Between the two conical sections there is a central section 33 of reduced diameter, and adjacent the conical section 32 there is an extended portion 34 of a diameter substantially smaller than the diameter of the two larger sections which taper into the two conical or bearing sections 31, 32.

The forward end of the carriage 16 has a hole 35 of a uniform given diameter extending through it in a direction parallel to the axis of the lead screw 20 and parallel to the axis of the support shaft 18. The axis of the hole is substantially exactly on the tangent to the record material 15 at the point where the head 10 engages it. By placing the axis of the pivot 30 on the tangent line slight up and down motion of the head 10 due to eccentricity of the drum 12 does not cause the air gap 45 in the head 10 to tilt as much as it would if the pivot 30 were above or below the tangent line. The arm 25, at the location where it is connected to the carriage, has a pair of spaced-apart flanges 36, 37 positioned on either side of that portion of the carriage through which the hole 35 extends. Each of the flanges 36, 37 has a hole through it registering with the hole 35 through the carriage 16. The hole in flange 37 is of the same diameter as the hole 35 in the carriage, and this is just sufficient to closely receive and engage the large diameter portions of the pivot member 30. The hole through the other flange 36 is smaller in diameter but is large enough to permit the reduced end 34 of the pivot member 30 to pass through it. The arm 25 is connected to the carriage 16 by placing the carriage 16 between the spaced flanges 36, 37 with the hole 35 in the carriage in registration with the two holes in the flanges. The pivot member 30 is then pushed through the holes, the reduced end 34 foremost, until the conical shoulder portion 32 of the pivot member is in bearing engagement with the hole through the flange 36. A spring-retaining member 40, shown best in Fig. 5, is connected to the side face of the arm 25 by means of the thumb screw 41 and the screw 42. At the end of the spring member 40 there is a small hole through which the sharp conical end 31 of the pivot member 30 extends. The spring 40 engages the pivot member 30 and biases it in a direction such that the conical bearing surface 32 is held against the flange 36.

The thumb screw 41 is threaded onto shaft 43 connected to the transducer head 10 and which extends through a hole in the mounting section 44 of the arm 25; thus the thumb screw also connects the head 10 to the arm 25. By loosening the thumb screw 41 slightly, the transducer head may be rotated until the air gap 45 is in its proper position to engage the record member 11 with the line 15 through the axis of the head extending through the center 46 of the drum 12. The thumb screw is then tightened and the transducer head will remain in its adjusted position. In order to help adjust the transducer head 10 and maintain it in place, a screw 50 is provided extending through the upper horizontal portion 51 of the adjusting plate 52. The adjusting plate 52 forms part of the arm 25 as it is connected to an extension of the flange 37 by means of the thumb screw 41 and the threaded stud 43 on the transducer head. The adjusting plate 52 will rotate with respect to the flange 37 about the stud 43 as a center when the thumb screw 41 is loose. The adjustable threaded bolt 50 extends through the horizontal portion 51 and engages the section 55 located between and integral with the flanges 36, 37 to fix the position of the adjusting plate 52 with respect to the remainder of the arm 25, and thus accurately to locate the transducer head 10 in its proper position. When the head 10 is in its proper position with the bolt 50 in contact with the extension 55, the lock nut 56 holds the bolt locked in place, and the thumb screw 41 is tightened.

A threaded bolt 60 is provided to prevent the pivotable arm 25 from moving too far with respect to the carriage 16 when the carriage is lifted to remove the head 10 from contact with the record member. As shown in Fig. 1, when the head 10 is riding on the record member 11, there is a slight space between the end of the bolt 60 and the end 61 of the carriage. When the carriage is lifted from the lead screw 20, the arm 25 pivots forward about the pivot member under the bias forces of a spring 70 until the end of the bolt 60 rests against the end 61 of the carriage, thereby preventing further forward motion of the arm 25 with respect to the carriage.

When the transducer head 10 is in engagement with the record material 11, it is desirable to have a slight spring pressure urging the head into stable contact with the record material. This spring bias is obtained from a spring 70, the central portion of which is coiled around the extension 34 of the pivot member 30, as shown in Fig. 4. One end 71 of the spring extends through a hole in an adjustable nut 72, and the nut 72 is secured to the pivot member 30 by a set screw 73, thereby anchoring the end 71 of the spring 70. The other end 74 of the spring 70 hooks behind the flange 36, thereby urging the arm 25 forward. The bias exerted by the spring 70 may be initially adjusted by releasing set screw 73 and then turning the adjustable nut 72 clockwise about the pivot member 30 to "wind up" the spring 70. The set screw is then tightened down on the pivot member 30 to hold the adjustable nut 72 and the spring 70 locked in place. Once this adjustment has been made, further adjustment of the bias preferably is effected by loosening set screw 81 and rotating the assembly comprised of thumb screw 72, spring 70 and pivot member 30 to its adjusted position, then tightening set screw 81.

For convenience in lifting the head 10 from the record member 11 without lifting the entire carriage and arm assembly, there is provided an extension 80 connected to the flange 37. When the transducer device is in the position shown in Fig. 1, the head 10 may be easily lifted from the record member 11 by pushing down on the end of the extension 80 causing the arm 25 to rotate about the pivot member against the bias of the spring 70 and raise the head 10.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A mounting device for mounting a transducer head adjacent a record member, comprising, in combination; a carriage having a hole through it at one end thereof; an arm having a pair of spaced-apart flanges each having a hole through it and carrying a transducer head; a pivot member extending through the holes in said pair of flanges and through the hole in said carriage to pivotably secure said arm to said carriage; first spring means connected to said arm and in engagement with said pivot member to bias said pivot member against one of said flanges, and second spring means mounted around said pivot member and in engagement with said arm biasing the transducer head on said arm toward the record member.

2. A mounting device as set forth in claim 1, further characterized by adjustable screw means connected to said arm between said flanges adapted to engage the carriage at a location between said flanges to limit the motion of said transducer head toward the record member.

3. A mounting device as set forth in claim 1, further characterized by means for adjusting the bias exerted by said second spring means.

4. A mounting device as set forth in claim 3, further characterized by adjustable screw means connected to said arm between said flanges adapted to engage the carriage at a location between said flanges to limit the motion of said transducer head toward the record member.

5. A mounting device for mounting a transducer head adjacent a record member, comprising, in combination; a carriage having a hole of a given diameter through it at one end thereof; an arm having a pair of spaced-apart flanges each having a hole through it, the hole through the first flange having a diameter equal to the diameter of the hole through said carriage and the hole through the second flange having a smaller diameter; means for connecting said transducer head to said arm; a pivot member having a section with a diameter substantially equal to said given diameter extending through said first flange and through the hole in said carriage, and said pivot member having a section of smaller diameter extending through the hole of smaller diameter in said second flange, and having a bearing shoulder between said two sections of different diameter bearing against said second flange; and spring means connected to said arm and in engagement with said pivot member to bias said pivot member against said second flange to hold said bearing shoulder in bearing engagement with said second flange.

6. A mounting device for mounting a transducer head adjacent a record member as set forth in claim 5, further characterized by second spring means mounted around said pivot member with one end fixed with respect to said pivot member and the other end in engagement with said arm biasing said transducer head on said arm toward the record member.

7. A mounting device as set forth in claim 6, further characterized by means connected to said second spring and connected to said pivot member for adjusting the bias exerted by said second spring on said arm.

References Cited in the file of this patent

UNITED STATES PATENTS

| | | |
|---|---|---|
| 788,790 | Pedersen | May 2, 1905 |
| 2,536,030 | Camras | Jan. 2, 1951 |
| 2,585,913 | Camras | Feb. 19, 1952 |
| 2,618,710 | Camras | Nov. 18, 1952 |
| 2,644,856 | Pettus | July 6, 1953 |
| 2,654,809 | Camras | Oct. 6, 1953 |